United States Patent [19]

Zabrocki et al.

[11] Patent Number: 4,579,906
[45] Date of Patent: Apr. 1, 1986

[54] ABS MOULDING MATERIALS WITH IMPROVED BURNING PROPERTIES AND PROCESS FOR THEIR PRODUCTION

[75] Inventors: Karl Zabrocki, Buettgen; Christian Lindner; Hubert Bosshammer, both of Cologne; Bernd Urbannek, Monchen-Gladbach, all of Fed. Rep. of Germany

[73] Assignee: Bayer Aktiengesellschaft, Leverkusen, Fed. Rep. of Germany

[21] Appl. No.: 694,107

[22] Filed: Jan. 23, 1985

[30] Foreign Application Priority Data

Feb. 4, 1984 [DE] Fed. Rep. of Germany ....... 3403975

[51] Int. Cl.$^4$ .................... C08L 55/02; C08L 27/18
[52] U.S. Cl. .................... 525/72; 524/501; 524/504; 524/411; 524/412; 525/197; 525/199
[58] Field of Search .................... 525/72, 199, 197; 524/501

[56] References Cited

U.S. PATENT DOCUMENTS

| | | | |
|---|---|---|---|
| 3,294,871 | 12/1966 | Schmitt et al. | 525/199 |
| 3,940,455 | 2/1976 | Kaufmann | 260/888 |
| 4,200,702 | 4/1980 | Gausepohl et al. | 525/72 |
| 4,355,126 | 10/1982 | Haaf et al. | 524/411 |

FOREIGN PATENT DOCUMENTS

| | | |
|---|---|---|
| 131751 | 1/1985 | European Pat. Off. |
| 2174049 | 2/1973 | France . |
| 1024778 | 4/1966 | United Kingdom . |

Primary Examiner—Carman J. Seccuro
Attorney, Agent, or Firm—Connolly and Hutz

[57] ABSTRACT

The invention relates to flame-resistant ABS moulding materials containing a fluoro-organic polymer besides customary flameproofing additives and to a process for their manufactures.

5 Claims, No Drawings

ABS MOULDING MATERIALS WITH IMPROVED BURNING PROPERTIES AND PROCESS FOR THEIR PRODUCTION

The invention relates to flame-resistant ABS moulding materials containing a fluoro-organic polymer besides customary flameproofing additives.

The term ABS moulding materials as need herein describes two-phase plastics of:

I. one or more thermoplastic copolymers of styrene and acrylonitrile, wherein all or some of the styrene can be replaced by α-methylstyrene, nuclear-substituted styrenes, methyl methacrylate, maleic anhydride or optionally substituted maleimide. This copolymer, also designated SAN resin or matrix resin, forms the outer continuous phase;

II. at least one graft polymer which has been prepared by a grafting reaction of one or more of the monomers mentioned under I. onto a rubber-like polymer ("graft base"). This graft polymer, also called the "elastomer phase" or "graft rubber", forms the disperse discontinuous phase.

ABS moulding materials are widely used for the production of moulded articles, for example interior components of automobiles, commodity articles and housings for example for office machines. A disadvantage is their flammability, which restricts their use for components exposed to heat. Flameproofing additives, for example antimony oxide or halogen-containing aromatics, such as octabromodiphenyl ether or pentabromophenyl benzoate, have been added to increase their flame-resistance, but the dripping on burning is not thereby adequately reduced.

It is known from U.S. Pat. No. 4,355,126 that dripping during the burning test of flame proofed ABS-moulding material provided can be significantly reduced by addition of polytetrafluoroethylene. However, such moulding materials prepared by conventional mixing are of little use, because their surface quality and mechanical properties are not adequate for many applications (microcracks and waviness).

The invention relates to ABS moulding materials of
I. 95–35 parts by weight of one or more matrix resins,
II. 5–65 parts by weight of one or more graft polymers,
III. 0.05–0.5 parts by weight of a tetrafluoroethylene polymer,
IV. 0–8% by weight (based on I+II+III) of an inorganic synergist for improving the flameproofing, and
V. 0–25% by weight (based on I+II+III) of at least one organic halogen compound, which are prepared by mixing an aqueous dispersion of component III with a latex of component II or a latex of component I or a latex mixture of components I and II, isolating the polymer mixture by coagulation and, optionally mixing with further graft polymer and/or resin polymer and with components IV and V in a manner known per se.

COMPONENT I

Matrix resins in the context of the invention are thermoplastic copolymers of styrene and acrylonitrile in which all or some of the styrene can be replaced by α-methylstyrene, nuclear-alkylated and nuclear-halogenated styrenes, methyl methacrylate, maleic anhydride or optionally substituted maleimide, and all or some of the acrylonitrile can be replaced by methacrylonitrile. The copolymers preferably have molecular weights of about $2 \times 10^4$ to $2 \times 10^5$ and can be prepared by customary polymerisation techniques, free radical bulk polymerisation and emulsion polymerisation being preferred.

Preferred copolymers are binary and ternary polymers of styrene/acrylonitrile, α-methylstyrene/acrylonitrile, styrene/acrylonitrile/methyl methacrylate, styrene/acrylonitrile/N-phenylmaleimide, p-methylstyrene/acrylonitrile and p-methylstyrene/acrylonitrile/N-phenylmaleimide. Particularly preferred are copolymers of 60–80 parts by weight of styrene respectively α-methylstyrene and 20–40 parts by weight of acrylonitrile.

COMPONENT II

Graft polymers in the context of the invention are products which are formed when at least one of the monomers listed under I. is polymerised in the presence of a rubber-like polymer which preferably contains double bonds ("graft base"). Such graft polymers are preferably prepared by emulsion polymerisation, in which latices of rubber-like polymers with average particle diameters $d_{50}$ of 0.1–2 μm are used as the graft base; the average particle diameters $d_{50}$ can be determined with an ultracentrifuge in accordance with the method of W. Scholtan, H. Lange: Kolloid . Z. und Z. für Polymere 250 (1972), 782–96.

The composition of the graft polymers is in the range from 8 to 80% by weight, in particular 20 to 60% by weight, of graft base and 92 to 20% by weight, in particular 80 to 40% by weight, of monomers polymerised in their presence.

Diene rubbers, such as polybutadiene, or acrylate rubber, such as polybutyl acrylate, or corresponding copolymers, for example of butadiene/butyl acrylate, styrene/butadiene or acrylonitrile/butadiene, are preferably used as the graft base.

The graft polymers can be prepared by subjecting the monomers or the monomer (for example styrene and acrylonitrile) to radical grafting copolymerisation, in aqueous emulsion, onto the rubbers, which are present in particle form in aqueous emulsion. If appropriate, the graft copolymers thereby obtained can be stabilised with phenolic antioxidants, isolated and further processed. Graft polymers of styrene and acrylonitrile on acrylate rubbers which are derived from $C_1$–$C_{10}$-alkyl acrylates as monomers, in particular from n-butyl acrylate, hexyl acrylate, ethylhexyl acrylate and ethyl acrylate, are also suitable according to the invention. The acrylate rubbers suitable as the graft base for styrene and acrylonitrile can contain copolymerised comonomers such as styrene, vinyl ether, butadiene, methyl methacrylate or vinyl acetate, in amounts of up to 40% by weight. These acrylate rubbers are at least partially crosslinked and can be prepared by free radical emulsion polymerisation of corresponding monomer mixtures, if appropriate in the presence of poly-functional ethylenically unsaturated monomers which act as crosslinking agents, such as divinylbenzene, alkylene glycol di(meth)acrylates, triallylisocyanurate or polyether glycol di(meth)acrylates. These graft polymers preferably contain 8–80% by weight of acrylate rubber, in particular 20–60% by weight.

Styrene/acrylonitrile graft polymers on acrylate rubber particles with a core/jacket structure (as described in European Pat. No. 34748) and styrene/acrylonitrile graft polymers on polybutadiene are particularly preferred.

COMPONENT III

Tetrafluoroethylene polymers which are suitable according to the invention have fluorine contents of 65–76% by weight, preferably 70–76% by weight. Examples are polytetrafluoroethylene, tetrafluoroethylene/hexafluoropropylene copolymers and tetrafluoroethylene copolymers containing small amounts of fluorine-free copolymerisable ethylenically unsaturated monomers. Such polymers are known from "Vinyl and Related Polymers", John Wiley & Sons, Inc., New York, 1952, pages 484–494; "Fluorpolymers", Wiley-Interscience, New York, 1972; "Encyclopedia of Polymer Science and Technology", Interscience Publishers, New York, Volume 13, 1970, pages 623–654; "Modern Plastics Encyclopedia", 1970–1971, Volume 47, No. 10 A, October 1970 McGraw-Hill, Inc., New York, pages 134, 138 and 774; "Modern Plastics Encyclopedia", 1975–1976, October 1975, Volume 52, No. 10 A, McGraw-Hill, Inc., New York, pages 27, 28 and 472 and U.S. Pat. Nos. 3,671,487, 3,723,373 and 3,838,092.

COMPONENT IV

Possible in organic synergists for improving the flame-resistance are oxides and carbonates of metals of main group V, such as $Sb_2O_3$, $Sb_2(CO_3)_3$, $Bi_2O_3$ and $Bi_2(CO_3)_3$. They are added to the polymer mixture in amounts of up to 8% by weight, preferably 3–6% by weight (based on I+II+III).

COMPONENT V

The usual flameproofing additives, in particular low molecular weight bromine compounds, can be used as the organic halogen compounds. Examples are octabromodiphenyl ethers, tetrabromophthalimide, tribromophenoxymethane, bis(tribromophenoxy)ethane, tris(tribromophenyl)triphosphate, trichlorotetrabromotoluene, hexabromocyclododecane and decabromodiphenyl ether. Component V is added in amounts of up to 25% by weight, preferably 14–22% by weight (based on I+II+III).

The moulding materials according to the invention can be prepared by first mixing an aqueous emulsion (latex) of a graft polymer with average latex particle diameters ($d_{50}$) of 0.1–2 μm, in particular 0.2–0.6 μm, with a fine-particled dispersion of a tetrafluoroethylene polymer with average dispersion particle diameters ($d_{50}$) of 0.05–20 μm, in particular 0.08–10 μm, in the given proportion; suitable tetrafluoroethylene dispersions have solids contents of 30–70% by weight, in particular 50–60% by weight. The dispersion mixture can then be worked up in a manner which is known per se, for example by spray-drying, freeze-drying or coagulation by the addition of inorganic or organic salts, acids, bases or organic water-miscible solvents, such as alcohols or ketones, preferably at temperatures of 20°–150° C., in particular 50°–100° C. If necessary, the product can be dried at 50°–200° C., preferably at 70°–100° C., after being washed.

If the thermoplastic polymers I are in latex form, the tetrafluoroethylene polymers (in the form of their fine-particled dispersion) can also be mixed with the thermoplastic polymers and the mixture can be worked up and used for the preparation of the moulding materials.

Similarly, it is possible to mix latex mixtures of components I and II with the dispersions of component III.

The mixtures of components I, II and III obtained in the ways described can be mixed with components IV and V in customary mixers, such as kneaders, extruders, mills or screws.

During or after the mixing process, customary auxiliaries and additives, such as lubricants, oxidation stabilisers, antistatics, colorants or the like, can additionally be incorporated as required.

The materials according to the invention can preferably be further processed by the methods of thermoplastic processing, such as granulation, injection moulding, extrusion, calendering, compression moulding or blow moulding. They are distinguished by a low tendency to drip on burning with, at the same time, an outstanding surface quality and good mechanical and thermal properties.

EMBODIMENT EXAMPLES

Materials used:

I. Styrene/acrylonitrile (weight ratio 66:34) copolymer with an average molecular weight $\overline{M}_w$ of 165.000, prepared by emulsion polymerisation and subsequently isolated as a powder.

II: Styrene/acrylonitrile graft polymer of 50% by weight of a styrene/acrylonitrile mixture (in a weight ratio of 72:28) on 50% by weight of polybutadiene in the form of particles with an average particle diameter ($d_{50}$) of 0.4 μm, prepared by emulsion polymerisation and isolated by coagulation.

III: Dispersion of polytetrafluoroethylene (Hostaflon TF 5032 ® Hoechst) with an F content of 70.5% by weight.

IV. $Sb_2O_3$

V. Decabromodiphenyl ether (DE 79 from Great Lakes Co.).

Preparation of a polymer mixture according to the invention

Dispersion III was mixed with the latex II of the graft polymer in a ratio (based on the solid polymers) of 0.1:99.9. After thorough distribution, 1.8% by weight, based on polymer solids, of phenolic antioxidants was added as an aqueous dispersion, an aqueous solution of $MgSO_4$ and acetic acid (pH=4–5) was added to the mixture at 85°–95° C., and the coagulate was filtered off, washed until virtually free from electrolytes, drained and dried at 100° C. to give a powder. This powder is designated "FR" below.

Preparation and testing of mixtures according to the invention

Constituents I, II, FR, IV and V were mixed on an internal kneader in the amounts shown in Table 1 (data in parts by weight).

TABLE 1

| Experiment | I | II | FR | IV | V |
|---|---|---|---|---|---|
| Comparison 1 | 60.0 | 40.0 | — | 6.0 | 20.0 |
| Comparison 2 | 80.0 | 20.0 | — | 6.0 | 18.0 |
| Example 1 | 60.0 | 40.0 | 2.0 | 6.0 | 20.0 |
| Example 2 | 80.0 | 20.0 | 2.0 | 6.0 | 18.0 |

Comparison 1 and 2 and examples 1 and 2 each contain as additive a mixture of 3.0 pentaerythritoltetrastearate, 0.2 silicone oil, 0.5 Sn stabiliser and 2.0 diphenyl-2-ethylhexyl phosphate.

The materials obtained were injection-moulded to test pieces and subjected to the following tests: impact strength in accordance with DIN 53,543 [$a_n$]

notched impact strength in accordance with DIN 53,543 [$a_k$]
heat distortion point in accordance with the Vicat B method [Vicat B]
burning test in accordance with the Underwriters Laboratories specification, page 94 [UL 94]
flammability testing in accordance with IBM standard DMH 6-0430-102 [IBM test]
visual evaluation of the surface.

Table 2 shows the test data achieved with the examples and comparison experiments:

|  | $a_n$ | $a_k$ | Vicat B | IBM test 1.6 mm | IBM test 3.2 mm | UL 94 1.6 mm | UL 94 3.2 mm | Surface |
|---|---|---|---|---|---|---|---|---|
| Comparison 1 | 96 | 12 | 90 | 15 | 25 | VO | VO | glossy |
| Comparison 2 | 63 | 6.2 | 91 | 15 | 30 | VO | VO | " |
| Example 1 | 96 | 12 | 88 | 20 | 55 | VO | VO | " |
| Example 2 | 62 | 6.9 | 90 | 35 | 60 | VO | VO | " |

IBM-test: The number means maximum flaming time of the test samples in 5-second-steps without burning and dripping of the samples.

Addition of polytetrafluoroethylene in powder form
(comparison experiments not according to the invention)

80 parts of resin I,
20 parts of graft polymer II,
3 parts of pentaerythritol tetrastearate,
0.2 part of silicone oil,
0.5 part of Sn stabiliser,
6.0 parts of $Sb_2O_3$ (IV) and
18.0 parts of DE79 (V)
were mixed in the customary manner, with the addition of the amount of polytetrafluoroethylene powder (Hostaflon TF 9202 from Hoechst) stated in Table 3. The surface quality was evaluated qualitatively, and the surface gloss was evaluated by the scale of A-H according to DE-AS (German Published Specification) 2,420,358.

TABLE 3

|  | [Parts] Amount of polytetrafluoroethylene powder added | Gloss level | Surface |
|---|---|---|---|
| Comparison experiment 3 | — | F | glossy |
| Comparison experiment 4 | 1 | C | slight veil formation |
| Comparison experiment 5 | 2 | B-C | severe veil formation |

We claim:
1. An moulding material consisting of
   I. 95 to 35 parts by weight of one or more matrix resin polymers prepared from a monomer mixture comprising vinylidene aromatic monomer and unsaturated nitrile monomer,
   II. 5 to 65 parts by weight of one or more graft polymers prepared by polymerizing a monomer mixture comprising vinylidene aromatic monomer and unsaturated nitrile monomer in the presence of a diene rubber or acrylate rubber,
   III. 0.05 to 0.5 parts by weight of a tetrafluoroethylene polymer,
   IV. 0 to 8% by weight (based on I+II+III) of an inorganic flameproofing synergist, and
   V. 0 to 25% by weight (based on I+II+III) of at least one organic halogen compound,
having been prepared by a process comprising mixing an aqueous dispersion of component III with a latex of component II or a latex of component I or a latex mixture of components I and II, isolating the polymer mixture by coagulation and then incorporating components IV and V.

2. An ABS moulding material according to claim 1, in which component I is a styrene/acrylonitrile copolymer or an α-methylstyrene/acrylonitrile copolymer.

3. An ABS moulding material according to claim 1 in which component II is a graft polymer of styrene/acrylonitrile on polybutadiene.

4. An ABS moulding material according to claim 1 in which component III is a tetrafluoroethylene polymer with a fluorine content of 70 to 76% by weight.

5. A process for the production of a flame-repellent moulding material according to claim 1, in which (A) an aqueous emulsion of component I is mixed with an aqueous dispersion of component III and an aqueous emulsion of component II, (B) the polymers are isolated from this mixture and dried.

* * * * *